United States Patent
Granville et al.

(10) Patent No.: US 10,989,047 B2
(45) Date of Patent: Apr. 27, 2021

(54) SYSTEMS AND METHODS FOR SAND FLOW DETECTION AND QUANTIFICATION

(71) Applicant: HALLIBURTON ENERGY SERVICES, INC., Houston, TX (US)

(72) Inventors: John Philip Granville, Humble, TX (US); Atchyuta Ramayya Venna, Houston, TX (US); Batakrishna Mandal, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 142 days.

(21) Appl. No.: 16/409,256

(22) Filed: May 10, 2019

(65) Prior Publication Data

US 2020/0355070 A1 Nov. 12, 2020

(51) Int. Cl.
*E21B 49/08* (2006.01)
*G01F 1/66* (2006.01)
(Continued)

(52) U.S. Cl.
CPC .............. *E21B 49/08* (2013.01); *G01F 1/666* (2013.01); *G01N 29/036* (2013.01); *E21B 43/04* (2013.01);
(Continued)

(58) Field of Classification Search
CPC .... E21B 47/08; E21B 47/107; E21B 49/0875; G01F 1/666; G01N 29/036
See application file for complete search history.

(56) References Cited

U.S. PATENT DOCUMENTS

| 6,531,694 B2 | 3/2003 | Tubel et al. |
| 7,134,320 B2 * | 11/2006 | Gysling .................. G01F 1/74 73/32 A |

(Continued)

FOREIGN PATENT DOCUMENTS

| EP | 2444799 A1 | 4/2012 |
| WO | 2017096416 A1 | 6/2017 |
| WO | 2018057029 A1 | 3/2018 |

OTHER PUBLICATIONS

Gibrata et al., "An Integrated Downhole Logging Suite Including Spectral Noise Logging to Improve Reservoir Characterization," SPE Middle East Oil and Gas Show and Conference, Abstract (Year: 2019).*

(Continued)

*Primary Examiner* — John Fitzgerald
(74) *Attorney, Agent, or Firm* — Polsinelli PC

(57) ABSTRACT

A method and system for receiving calibration information including a first power spectral density (PSD) value and a first sand concentration value at a particular frequency. Data is collected in a liquid flow at the particular frequency at a first depth in a downhole environment. A second power spectral density (PSD) value is then determined for the data in the liquid flow at the particular frequency. The second PSD value being compared with the first PSD value. Sand can also be determined to be present in the liquid flow when the second PSD value is greater than the first PSD value by a predefined threshold. A second sand concentration value of the sand present in the liquid flow being quantified based on the first sand concentration value.

20 Claims, 11 Drawing Sheets

(51) Int. Cl.
   *G01N 29/036* (2006.01)
   *E21B 43/08* (2006.01)
   *E21B 47/18* (2012.01)
   *E21B 43/04* (2006.01)
   *E21B 47/107* (2012.01)

(52) U.S. Cl.
   CPC ............ *E21B 43/08* (2013.01); *E21B 47/107* (2020.05); *E21B 47/18* (2013.01); *E21B 49/0875* (2020.05); *G01N 2291/02416* (2013.01)

(56) References Cited

U.S. PATENT DOCUMENTS

| | | | |
|---|---|---|---|
| 7,596,987 B2* | 10/2009 | Gysling | G01F 1/74 |
| | | | 73/32 A |
| 7,659,828 B2* | 2/2010 | Wehrs | G01F 1/666 |
| | | | 340/603 |
| 9,784,862 B2 | 10/2017 | Childers et al. | |
| 2002/0134144 A1* | 9/2002 | Gysling | G01N 29/42 |
| | | | 73/61.79 |
| 2002/0152802 A1* | 10/2002 | Gysling | G01H 5/00 |
| | | | 73/61.79 |
| 2003/0066359 A1* | 4/2003 | Gysling | G01F 1/74 |
| | | | 73/861.23 |
| 2005/0000289 A1* | 1/2005 | Gysling | G01N 29/42 |
| | | | 73/645 |
| 2005/0061060 A1* | 3/2005 | Gysling | G01F 1/849 |
| | | | 73/32 A |
| 2005/0246111 A1* | 11/2005 | Gysling | G01F 1/666 |
| | | | 702/45 |
| 2006/0144148 A1* | 7/2006 | Gysling | G01N 29/42 |
| | | | 73/597 |
| 2007/0069903 A1* | 3/2007 | Wehrs | G01N 33/2823 |
| | | | 340/603 |
| 2007/0175280 A1* | 8/2007 | Johansen | G01N 29/032 |
| | | | 73/599 |
| 2008/0133182 A1* | 6/2008 | Gysling | G01F 1/34 |
| | | | 702/189 |
| 2008/0223129 A1* | 9/2008 | Gysling | G01N 9/002 |
| | | | 73/32 A |
| 2016/0258281 A1 | 9/2016 | Mandal | |
| 2019/0120044 A1* | 4/2019 | Langnes | G01V 1/001 |
| 2019/0326906 A1* | 10/2019 | Camacho Cardenas | F04D 29/18 |
| 2020/0032639 A1* | 1/2020 | Langnes | G01V 1/50 |
| 2020/0109612 A1* | 4/2020 | Granville | E21B 43/025 |
| 2020/0173273 A1* | 6/2020 | Thiruvenkatanathan | G06F 30/20 |
| 2020/0174149 A1* | 6/2020 | Thiruvenkatanathan | E21B 47/14 |
| 2020/0182047 A1* | 6/2020 | Langnes | E21B 47/135 |
| 2020/0190971 A1* | 6/2020 | Thiruvenkatanathan | E21B 47/107 |
| 2020/0200000 A1* | 6/2020 | Langnes | E21B 47/00 |
| 2020/0291772 A1* | 9/2020 | Thiruvenkatanathan | G01V 1/42 |
| 2020/0309981 A1* | 10/2020 | Ang | G01V 1/50 |
| 2020/0355838 A1* | 11/2020 | Venna | G01V 1/306 |

OTHER PUBLICATIONS

Aslanyan et al., "Determination of Sand Production Intervals in Unconsolidated Sandstone Reservoirs Using Spectral Acoustic Logging," SPE/IATMI Asia Pacific Oil & Gas Conference and Exhibition, Abstract (Year: 2019).*

International Search Report and Written Opinion; PCT Application PCT/US2019/057926; dated Feb. 6, 2020.

* cited by examiner

US 10,989,047 B2

SYSTEMS AND METHODS FOR SAND FLOW DETECTION AND QUANTIFICATION

TECHNICAL FIELD

The present technology pertains to highly optimized detection and quantification of sand flows in tubular structures based on data such as acoustic data obtained from an embedded computing device.

BACKGROUND

For oil or gas wells that have a gravel pack, a sand screen may be used to restrict the flow of sand into the well. Over time, however, the sand screen may become eroded due to impacts by the sand. Larger sand grains, higher concentrations of sand, and higher sand flow rates may lead to an increase in erosion of the sand screen and may lead to more sand in the well. Sand flowing into a well may cause asset degradation through equipment downhole and at a surface as well as reduce the production. The sand in the reservoir and the related infrastructure may lead to lowered efficiency, loss of production, and costly repairs. Ideally, it would be desirable to log data associated with the well to determine if sand is affecting the well. However, it is impractical and difficult to efficiently deliver information about the well.

It is with these issues in mind, among others, that various aspects of the disclosure were conceived.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
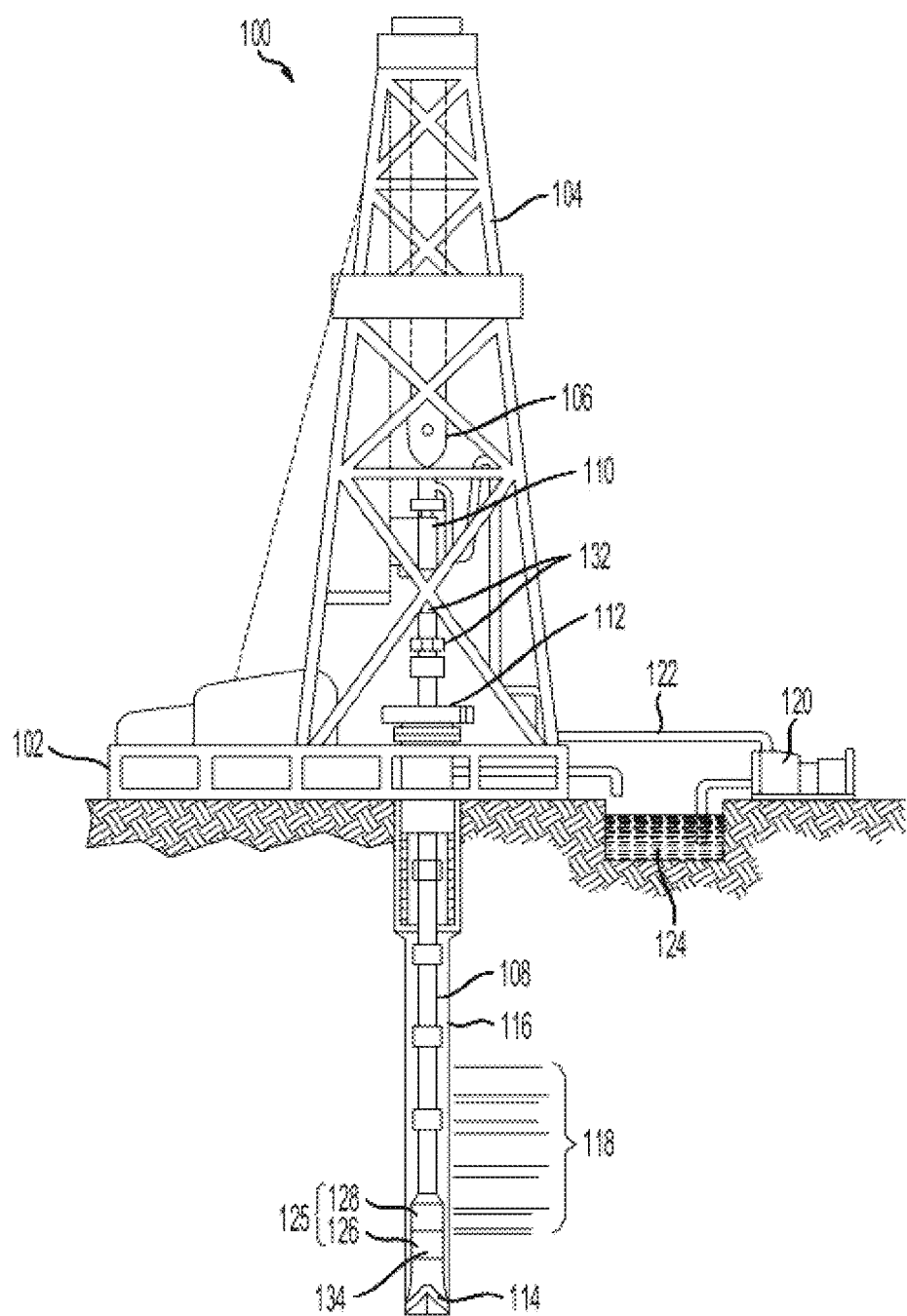
FIG. 1A is a schematic diagram of an example logging while drilling (LWD) wellbore operating environment, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents. The various characteristics described in more detail below, will be readily apparent to those skilled in the art with the aid of this disclosure upon reading the following detailed description, and by referring to the accompanying drawings.

An embedded computing device may be used downhole to collect data such as acoustic data at predefined, discrete frequencies to efficiently characterize a flow as a liquid only flow or a flow having sand present. Rather than using a large number of frequencies, the embedded computing device may use a small subset of discrete frequency values that span a dynamic range. The embedded computing device may obtain data about a flow using a hydrophone and determine an amplitude or Power Spectral Density (PSD) at each predefined, discrete frequency and compare the amplitude or PSD with a reference amplitude or reference PSD based on experimental data to determine whether sand is present or not present. If sand is present, the embedded computing device may determine a sand concentration at each predefined, discrete frequency. The embedded computing device may send a notification indicating whether sand is present or not present and information associated with sand concentration in real-time to a computing device on the surface.

Disclosed herein are systems, methods, and computer-readable storage media for highly optimized detection and quantification of sand flows in tubular structures based on data such as acoustic data obtained from an embedded computing device. An embedded computing device may be used downhole to collect data such as acoustic data at predefined, discrete frequencies to efficiently characterize a flow as a gas/liquid only flow or a flow having sand present. Rather than using a large number of frequencies, the embedded computing device may use a small subset of discrete frequency values that span a dynamic range. The embedded computing device may obtain data about a flow using a hydrophone and determine an amplitude or Power Spectral Density (PSD) at each predefined, discrete frequency and compare the amplitude or PSD with a reference amplitude or reference PSD based on experimental data to determine whether sand is present or not present. Laboratory or experimental data indicates that determination of whether sand is present or not present is most evident at frequencies greater than 500 kHz. If sand is present, the embedded computing device may determine a sand concentration at each predefined, discrete frequency. The embedded computing device may send a notification indicating whether sand is present or not present and information associated with sand concentration in real-time to a computing device on the surface. This information may be acted upon to quickly address and remediate any issues downhole.

According to at least one aspect, an example method for highly optimized detection and quantification of sand flows in tubular structures is provided. The method can include receiving, by at least one processor, calibration information comprising a first power spectral density (PSD) value and a first sand concentration value at a particular frequency, collecting, by at least one processor, data in a liquid flow at the particular frequency at a first depth in a downhole environment, determining, by the at least one processor, a second power spectral density (PSD) value for the data in the liquid flow at the particular frequency, comparing, by the at least one processor, the second PSD value with the first PSD value and determining that sand is present in the liquid flow when the second PSD value is greater than the first PSD value by a predefined threshold, and quantifying, by the at least one processor, a second sand concentration value of the sand present in the liquid flow based on the first sand concentration value.

According to at least one aspect, an example system for highly optimized detection and quantification of sand flows in tubular structures is provided. The system can include one or more processors and at least one computer-readable storage medium having stored therein instructions which, when executed by the one or more processors, cause the system to receive calibration information comprising a first power spectral density (PSD) value and a first sand concentration value at a particular frequency, collect data in a liquid flow at the particular frequency at a first depth in a downhole environment, determine a second power spectral density (PSD) value for the data in the liquid flow at the particular frequency, compare the second PSD value with the first PSD value and determine that sand is present in the liquid flow when the second PSD value is greater than the first PSD value by a predefined threshold, and quantify a second sand concentration value of the sand present in the liquid flow based on the first sand concentration value.

According to at least one aspect, an example non-transitory computer-readable storage medium for highly optimized detection and quantification of sand flows in tubular structures is provided. The non-transitory computer-readable storage medium can include instructions which, when executed by one or more processors, cause the one or more processors to perform operations including receiving calibration information comprising a first power spectral density (PSD) value and a first sand concentration value at a particular frequency, collecting data in a liquid flow at the particular frequency at a first depth in a downhole environment, determining a second power spectral density (PSD) value for the data in the liquid flow at the particular frequency, comparing the second PSD value with the first PSD value and determining that sand is present in the liquid flow when the second PSD value is greater than the first PSD value by a predefined threshold, and quantifying a second sand concentration value of the sand present in the liquid flow based on the first sand concentration value.

In some aspects, the systems, methods, and non-transitory computer-readable storage media described above can include a hydrophone to perform the operations as discussed above in response to highly optimized detection and quantification of sand flows in tubular structures based on data obtained from an embedded computing device.

As follows, the disclosure will provide a more detailed description of the systems, methods, computer-readable media and techniques herein for highly optimized detection and quantification of sand flows in tubular structures based on data obtained from an embedded computing device. The disclosure will begin with a description of example systems and environments, as shown in FIGS. 1A through 10. A description of example methods and technologies for highly optimized detection and quantification of sand flows in tubular structures based on data obtained from an embedded computing device, as shown in FIGS. 5, 6, 7, 8, and 9, will then follow. The disclosure concludes with a description of an example computing system architecture, as shown in FIG. 10, which can be implemented for performing computing operations and functions disclosed herein. These variations shall be described herein as the various embodiments are set forth.

The disclosure now turns to FIG. 1A, which illustrates a schematic view of a logging while drilling (LWD) wellbore operating environment 100 in in accordance with some examples of the present disclosure. As depicted in FIG. 1A, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various formations 118. A pump 120 circulates drilling fluid through a supply pipe 122 to top drive 110, down through the interior of drill string 108 and orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled with one or more wires and/or other media. The logging tools 126 may also include one or more computing devices 134 communicatively coupled with one or more of the one or more tool components by one or more wires and/or other media. The one or more computing devices 134 may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drillpipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drillpipe.

Figure 1B:
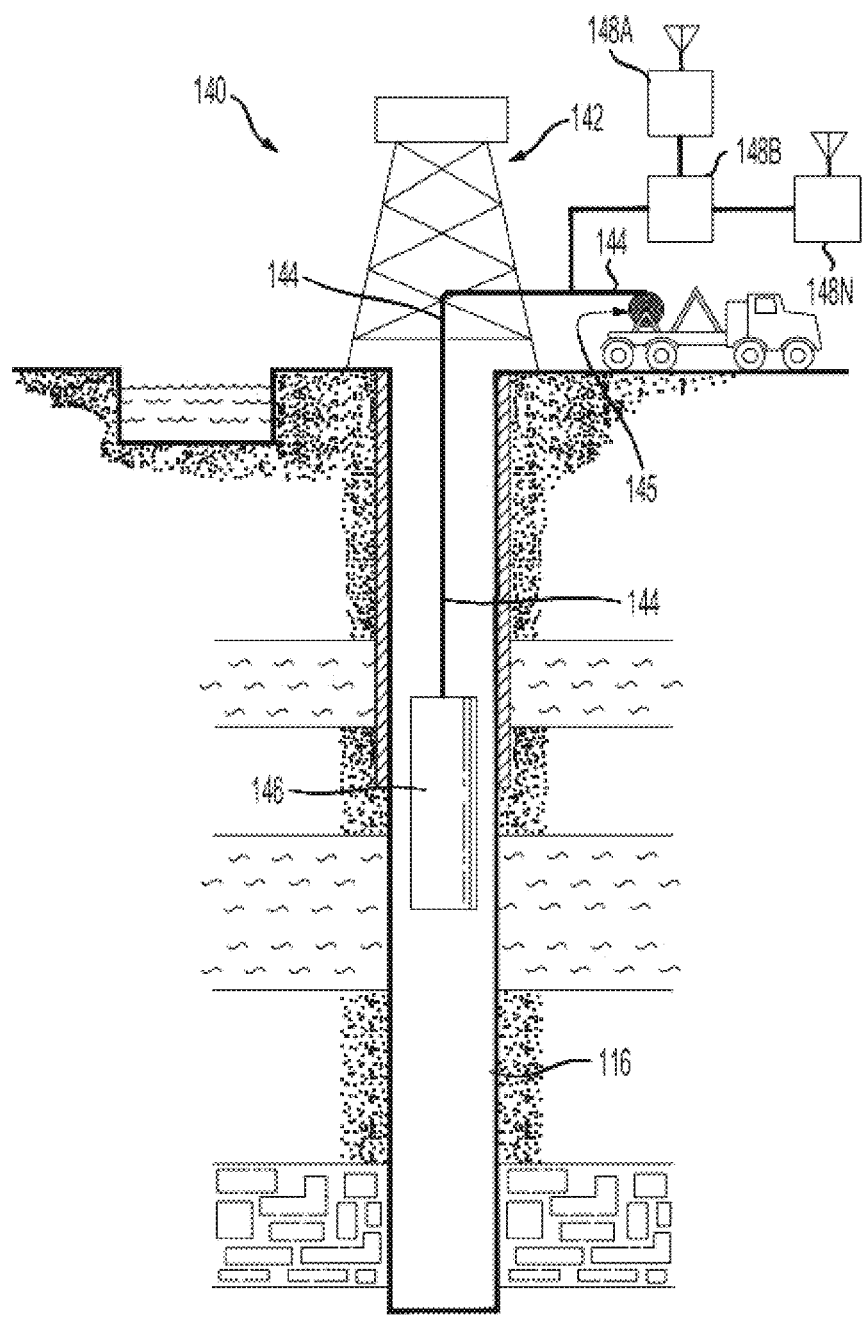
FIG. 1B is a schematic diagram of an example downhole environment having tubulars, in accordance with some examples.

Referring to FIG. 1B, an example system 140 for downhole line detection in a downhole environment having tubulars can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a conveyance 144 can be used. The tool body 146 can include a logging tool. The tool body 146 can be lowered into the wellbore 116 by conveyance 144. The conveyance 144 can be anchored in the drill rig 145 or in a portable means such as a truck. The conveyance 144 can include one or more wires, slicklines, cables, and/or the like, as well as tubular conveyances such as coiled tubing, joint tubing, or other tubulars, and may include a downhole tractor.

The illustrated conveyance 144 provides support for the tool, as well as enabling communication between tool processors 148A-N on the surface and providing a power supply. In some examples, the conveyance 144 can include electrical and/or fiber optic cabling for carrying out communications. The conveyance 144 is sufficiently strong and flexible to tether the tool body 146 through the wellbore 116, while also permitting communication through the conveyance 144 to one or more processors 148A-N, which can include local and/or remote processors. Moreover, power can be supplied via the conveyance 144 to meet power requirements of the tool. For slickline or coiled tubing configurations, power can be supplied downhole with a battery or via a downhole generator.

Disclosed herein are highly optimized systems and methods for detecting and quantifying sand flow in a tubular structure. According to studies, acoustic energy from sand impacting a logging tool is strongest at frequencies greater than 1 MHz. Ideally, recording logging data at 2 MHz or higher would provide highly accurate characterization of sand concentration. However, this can be impractical for logging operations and it has been a challenge to efficiently deliver accurate characterizations of sand concentration. Methods and systems are discussed herein that provide an efficient and optimized way of determining sand concentration in a sand flow in a tubular structure that may be used to provide real-time information.

For oil or gas wells that have a gravel pack, a sand screen may be installed to restrict the flow of sand into the well. Over time, the sand screen may become eroded due to impacts by the sand. As a result, the sand may flow into a reservoir and through equipment downhole and at the surface. This may cause asset degradation. An efficient, highly optimized method for characterization of sand flows in liquid and gas wells through objects and media such as sand screens, gravel packs, and perforations may address these problems. The system may be used in a tubular environment with fluid (e.g., liquid, gas, or liquid/gas combination) flow and may be used to provide real-time detection and quantification of solid matter (e.g., sand) flowing through a fluid medium.

There are known differences between acoustic and vibrational characteristics for scenarios where solid matter (e.g., sand) impacts a downhole tool versus scenarios where only liquid comes into contact with the tool. Laboratory data has been obtained from sand and no-sand flow scenarios. Based on the laboratory data, flow energy from liquid-only flows is generally less than 50 kHz and energy from flows having sand can be detected up to 1 MHz or higher from flows where sand impacts an acoustic receiver device.

In one example, the data is collected by the logging tools 126 such as acoustic receivers and devices such as hydrophones and the differences between the laboratory data and the collected data can be measured. In addition, the data may be collected and the differences may be observed using other logging tools 126 such as acoustic or vibrational sensors such as fiber optic cable, geophones, and accelerometers. Characteristics such as frequency, amplitude, PSD, energy, and phase, among others, may be used to differentiate between a liquid/sand flow and a liquid-only flow. As an example, the acoustic information, e.g., the sound produced by the flow may be recorded by at least one sensor arranged in a linear array or an azimuthal array. The at least one sensor may be an acoustic analysis tool having at least one hydrophone with tool memory to record waveforms, among others. The frequency range of the at least one sensor tested according to laboratory experiments ranged from 100 Hz to 1 MHz.

The system and method discussed herein use spectral ratios and comparisons of acoustic data at predefined, discrete frequencies to efficiently characterize a flow as liquid only or liquid/sand. When sand is determined to be present in the flow, a sand concentration may be quantified and determined. As an example, the liquid may include oil, water, or oil and water. Rather than using all frequency values in a particular range of frequency values, a smaller subset of discrete frequency values may be selected that may span the dynamic range of the system. Using the smaller subset of discrete frequency values, an expected amplitude or reference amplitude may be compared with an amplitude measured by the logging tool 126, e.g., a device such as the acoustic receiver. In other words, a Power Spectral Density (PSD) measured by the acoustic receiver may be compared with a reference PSD at each of the smaller subset of discrete frequency values. The reference PSDs may be based on the laboratory data of known sand concentration and flow velocity. The reference PSDs also may be based on lower sections of the well below an identified sand production zone where there could be transverse (e.g., perpendicular) flow. The reference PSDs may be compared with data as determined by the acoustic receiver to generate the comparison or ratio that may indicate the presence of sand. The comparison or ratio may be determined at a plurality of depths in the well. For each depth, the same smaller subset of discrete frequency values may be used to compute PSD comparisons or ratios.

For each depth where the acoustic amplitudes (e.g., PSDs) are measured at each discrete frequency, the system and method may determine whether the amplitude exceeds the reference amplitude by a predetermined, predefined, and/or particular threshold. The predefined threshold may be based on a particular well environment. If the amplitude is greater than the reference amplitude by the predefined threshold, this can be indicative of sand in the flow. If the flow is determined to contain sand, the system and method may determine an estimate of sand concentration by applying a transfer function that is derived from experimental data of known flow rates, velocities, and sand concentrations. The estimate of sand concentration also may be determined by using flow information that may be available from other downhole tools 126 such as a production logging tool that may measure production flow rate. In order to provide a binary classification of the flow (e.g., sand or no sand), the system and method also may use a threshold in energy as a cutoff to determine whether there is sand or no sand. An optimal frequency band for energy calculation is discussed further herein.

As a result, the system and method may utilize high frequency acoustic data to provide an accurate determination of sand concentration that may be used to efficiently provide real-time information.

The method may detect and characterize sand flow in liquid and/or gas wells through media and objects such as sand screens, gravel packs, and perforations. The method may include recording high frequency acoustic data (e.g., data greater than 500 kHz) that may provide a high accuracy differentiation between a sand flow and a no-sand flow. The method may use advanced signal processing, data optimization, and data reduction to reduce data acquisition and computational load. The method may utilize sparse, but optimized sampling of data to deliver a highly accurate binary determination of the presence of sand in real-time while limiting memory and bandwidth usage. Using this optimized data, the system does not have to have large onboard memory, high-bandwidth telemetry, or special data acquisition systems such as fiber optic systems where MHz sampling may be used and data volume can become exponential (e.g., terabytes). The system discussed herein may be suited for scenarios that can have real-time or near-real-time characterization of particulate (e.g., solid matter) flow in a tubular environment.

The method may allow for multiple logs of data of the same well. A well could be logged in a first instance to identify a problem zone, logged in a second instance after remediation, and logged on a regular basis to identify new zones where sanding is, or could become, a problem. As a result, the sand flow in the well could be efficiently characterized and information associated with the sand flow in the well could be communicated in real-time. The information may be based on high frequency analysis of the sand concentration in the well.

The method for sand flow detection and quantification may include generating a reference formula or a table that includes amplitude values as function of frequency for liquid (e.g., water, oil, or water/oil) and liquid/sand flows having various concentrations of sand. In one example, the reference formula or table may use PSD or amplitude as a function of frequency. The reference amplitudes can be based on laboratory data of known sand concentration and flow velocity. In addition, the reference amplitudes can be based on data from lower sections of the well below any identified leaks where there will be transverse (e.g., perpendicular) flow. The reference formula or table may provide a baseline of data that may be used by the method to compare with live data and identify differences between the reference data and the live data that may indicate sand injection.

In addition, the method may utilize a number of discrete frequency values that may be representative of differences between liquid flows and liquid/sand flows. In one example, the number of discrete frequency values where PSD is measured may span a range from lower frequencies to higher frequencies (e.g., 0.5 kHz, 5 kHz, 50 kHz, 500 kHz, 2,500 kHz) to characterize the flow. As another example, the PSD may be measured in range of frequencies such as 500 kHz, 1,000 kHz, 1,500 kHz, 2,000 kHz, and 2,500 kHz. For each frequency in the range of frequencies, the method includes generating a comparison or ratio between the amplitude or PSD of data measured by an acoustic receiver or hydrophone with the associated reference amplitude or PSD. The comparison or ratio should be determined at every depth of interest in the well. For each depth where amplitudes are measured and compared, the method may include determining whether the PSD exceeds the reference value by a predefined threshold.

In one example, the frequency range may be from 250 kHz to 2,500 kHz. For each depth where the acoustic amplitudes (e.g., PSDs) are measured at each discrete frequency, the system and method may determine whether the amplitude exceeds the reference amplitude by a predetermined, predefined, and/or particular threshold. The predefined threshold may be based on a particular well environment. If the amplitude is greater than the reference amplitude by the predefined threshold, this can be indicative of sand in the flow.

As an example, for each frequency in the frequency range, if the average of the measured PSD minus the reference PSD is less than or equal to 5 dB, then it is determined that there is a liquid only flow. Based on an experimental study, it has been determined that sand energy is at least 1.78 times (5 dB) greater than the energy for flow only. However, if the average of the measured PSD minus the reference PSD is greater than 5 dB, then it is determined that there is a flow with sand present in the liquid.

If the flow contains sand, then the method includes determining an estimate of sand concentration. The estimate of sand concentration may be based on a transfer function that may be derived from experimental data of known flow rates, velocities, and sand concentrations. In addition, the estimate of sand concentration may be determined based on flow information available from other downhole tools 126 including a production logging tool, which may measure production flow rate. The transfer function may be used to derive sand concentration based on the PSD and flow information in the reference table or from the production logging tool.

After it is determined whether there is sand in the flow, the determination and a sand concentration may be sent uphole in real-time to a computing device.

The method indicates that certain frequency bands may better demonstrate the presence of sand in a liquid flow than others and may provide a higher classification accuracy. The best frequency may be determined by selecting a width of a frequency band, a step size for each iteration, a start frequency, and a stop frequency. As an example, the width of each frequency band may be 50 kHz, the step size for each iteration may be 10 kHz, the start frequency may be 0 kHz, and the stop frequency may be 1000 kHz. The method may be used to determine the PSD at each frequency or each frequency band from the start frequency to the stop frequency. The start and stop frequency may be increased by 10 kHz until the stop frequency reaches 1 MHz. An optimal threshold energy value may be determined that indicates a flow that has sand from a flow that does not have sand. A start frequency and a stop frequency may be determined that provide maximum accuracy for classifying a flow.

In some embodiments, the method may be performed by an embedded computing device located downhole. In other embodiments, the method may be performed by a computing device located onsite at the surface. In other embodiments, the method may be performed offsite at a data processing center such as a cloud computing server. Additionally, the method can be performed partially by the embedded computing device located downhole, partially at the computing device located onsite at the surface, and/or partially offsite at the data processing center.

Although amplitude from hydrophones may be used, other data may be used such as spectral ratios from non-hydrophone sensors such as geophones, accelerometers, and/or fiber optic cables. In addition, hydrophone spectral ratios may be combined with the other sensor data including the data from geophones, accelerometers, and/or fiber optic cables. The method may use amplitude and frequency to determine the presence of sand and may also utilize flow rate and flow velocity to determine the presence of sand. The spectral ratios may be determined for a particular depth and also may be used at multiple depths to determine the presence of sand.

Figure 2:
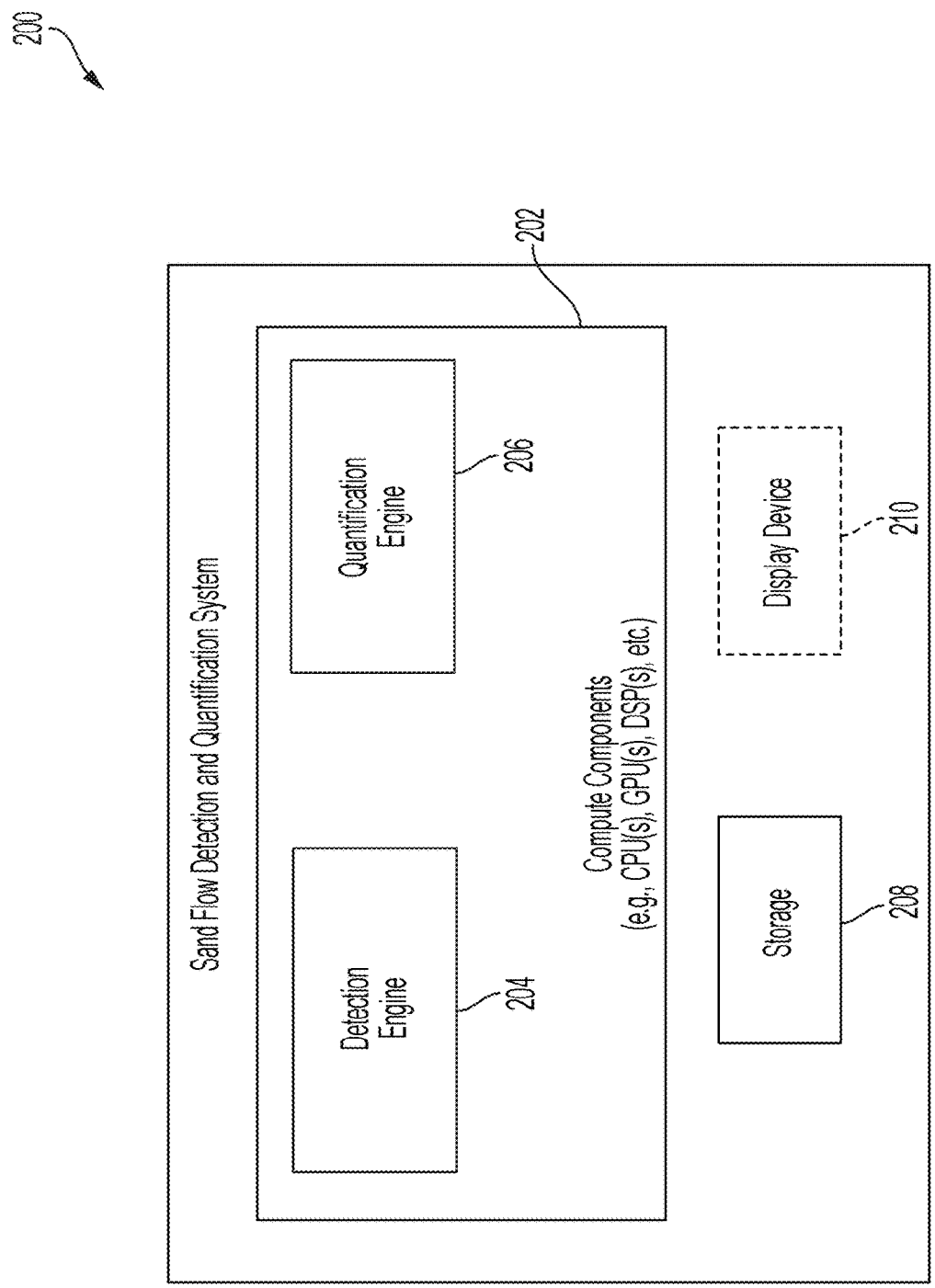
FIG. 2 is a block diagram of an example sand flow detection and quantification system, in accordance with some examples.

FIG. 2 illustrates an example sand flow detection and quantification system 200. The sand flow detection and quantification system 200 can be implemented for detecting and quantifying sand in a liquid flow as described herein. As noted above, the sand flow detection and quantification system 200 may be an embedded system or embedded computing device located downhole. In other examples, the sand flow detection and quantification system 200 may be a computing device located onsite at the surface. In another example, the sand flow detection and quantification system 200 may include a computing device located at a data processing center. Even further, the sand flow detection and quantification system 200 may be partially located in the embedded system located downhole and partially located at a computing device located onsite at the surface.

In this example, the sand flow detection and quantification system 200 can include compute components 202, a detection engine 204, a quantification engine 206, and a storage 208. In some implementations, the sand flow detection and quantification system 200 can also include a display device 210 for displaying data and graphical elements such as images, videos, text, simulations, and any other media or data content.

The sand flow detection and quantification system 200 can be part of, or implemented by, one or more computing devices, such as one or more servers, one or more personal computers, one or more processors, one or more mobile devices (e.g., a smartphone, a camera, a laptop computer, a tablet computer, a smart device, etc.), and/or any other suitable electronic device. In some cases, the one or more computing devices that include or implement the sand flow detection and quantification system 200 can include one or more hardware components such as, for example, one or more wireless transceivers, one or more input devices, one or more output devices (e.g., display device 210), one or more sensors (e.g., an image sensor, a temperature sensor, a pressure sensor, an altitude sensor, a proximity sensor, an inertial measurement unit, etc.), one or more storage devices (e.g., storage system 208), one or more processing devices (e.g., compute components 202), etc.

As previously mentioned, the sand flow detection and quantification system 200 can include compute components 202. The compute components can be used to implement the detection engine 204, the quantification engine 206, and/or any other computing component. The compute components 202 can also be used to control, communicate with, and/or interact with the storage 208 and/or the display device 210. The compute components 202 can include electronic circuits and/or other electronic hardware, such as, for example and without limitation, one or more programmable electronic circuits. For example, the compute components 202 can include one or more microprocessors, one or more graphics processing units (GPUs), one or more digital signal processors (DSPs), one or more central processing units (CPUs), one or more image signal processors (ISPs), and/or any other suitable electronic circuits and/or hardware. Moreover, the compute components 202 can include and/or can be implemented using computer software, firmware, or any combination thereof, to perform the various operations described herein.

The detection engine 204 can be used to process data, analyze data, and detect sand in a liquid flow. The detection engine 204 can generate a reference table as discussed in reference to method 500. The reference table may include an expected range of fluid types, sand concentration percentages, orifice sizes, flow rates, and flow velocities. The reference table may be based on experimental or simulation data. As indicated in the experimental data, orifice sizes, flow rates, and flow velocities are interrelated.

The detection engine 204 may apply preprocessing to the data in the reference table such as anti-alias filtering, tapering, and/or median filtering. The detection engine 204 may compute Power Spectral Density (PSD) for energy for each waveform in the data in the reference table. Next, discrete frequency values or frequency bands representative of differences between liquid or gas flows with sand and liquid or gas flows with sand may be defined and selected. Ratios for each representative frequency value or band defined and selected may be computed.

Optimal thresholds may be generated that may be used to provide a binary classification of a flow, e.g., flow with sand or flow without sand. Formulas and/or transfer functions may be added to the reference table that may be used to quantify sand concentration in a flow. The reference table may be finalized and generated as a file or table that can be used to classify a flow as a flow with sand or a flow without sand and determine a sand concentration.

The detection engine 204 may load the finalized file or table into the logging tool 126. The logging tool 126 may be inserted into the environment of interest to collect data such as acoustic data from at least one hydrophone arranged in a linear array or an azimuthal array. Although amplitude from one or more hydrophones may be used, other data may be used such as spectral ratios from non-hydrophone sensors such as geophones, accelerometers, and fiber optic cables. In addition, hydrophone spectral ratios may be combined with the other sensor data including the data from geophones, accelerometers, and fiber optic cables. The method may use amplitude and frequency to determine the presence of sand and may also utilize flow rate and flow velocity to determine the presence of sand.

The detection engine 204 may collect data at a particular depth in the environment of interest. In one example, this may include collecting acoustic data using a hydrophone using at least one different frequency. The acoustic data may be preprocessed using anti-alias filtering, tapering, or median filtering. The acoustic data may be evaluated to determine a Power Spectral Density (PSD) or an amplitude at each different frequency at the particular depth. In one example, the frequency range may be from 250 kHz to 2,500 kHz.

A number of discrete frequencies may be selected for collecting the acoustic data. The number of discrete frequency values where PSD is measured may span a range from lower frequencies to higher frequencies (e.g., 0.5 kHz, 5 kHz, 50 kHz, 500 kHz, 2,500 kHz) to characterize the flow. As another example, the PSD may be measured in range of frequencies such as 500 kHz, 1,000 kHz, 1,500 kHz, 2,000 kHz, and 2,500 kHz. For each frequency in the frequency range, if the average of the measured PSD minus the reference PSD is less than or equal to 5 dB, then it is determined that there is a liquid only flow. However, if the average of the measured PSD minus the reference PSD is greater than 5 dB, then it is determined that there is a flow with sand present in the liquid.

As an example, only six different frequencies may be analyzed at the particular depth rather than a large number of different frequencies in a range. The PSD may be compared with the information or in the finalized file or table to determine a ratio or a comparison. If the ratio or comparison is greater than a particular threshold, then the detection engine 204 may determine that there is sand in the flow. If the ratio or comparison is less than or equal to the particular threshold, then the detection engine may determine that there is no sand or minimal sand in the flow.

If there is sand determined to be in the flow, the quantification engine 206 may apply the formula and/or the transfer function using the information in the finalized file or table. The quantification engine 206 may quantify and determine a percentage of sand concentration in the flow at each different frequency at the particular depth, e.g., 0.25%, 0.5%, 1%, 3%, 5%, or another percentage. Alternatively, the sand concentration may be indicated as a number of parts-per-million. In addition, the quantification engine 206 may generate a log of the sand concentration at each different frequency at the particular depth. The quantification engine 206 also may generate a graph of the sand concentration at each different frequency at the particular depth. The graph may be used to show the sand concentration at each different frequency at a plurality of depths in the environment of interest. In other words, the graph provides a profile of sand concentration at the plurality of depths in the wellbore.

The quantification engine 206 may send information associated with the presence of sand and the sand concentration at the particular depth in real-time or near real-time to a computing device. In one example, the computing device may be located on the surface or in another location. Sending all data up to the computing device located on the surface would be inefficient and may require a lot of bandwidth.

Instead, the quantification engine 206 may send a binary indication of whether there is sand or no sand determined to be in the wellbore at a particular depth in a first particular message or notification and may send information associated with sand concentration at the particular depth if sand is determined to be present in a second particular message or notification. In another example, the message or notification may include information associated with the binary indication of whether there is sand or no sand determined to be in the wellbore at the particular depth and may also include information associated with sand concentration at the particular depth.

By sending this information in real-time, the problem associated with the sand can be addressed and remediated expediently. This may allow a user to understand where a problem with sand is occurring, a severity of the problem, and other information so that the sand can be addressed. This may require a change in production at the well such as scaling back production or may require that the well be shut down at least temporarily. If the information is not received in a timely fashion, it could result in loss of production and financial consequences for the well. It could even result in more severe problems and issues.

Additionally, the quantification engine 206 may determine that certain frequency bands may better demonstrate the presence of sand in a liquid flow than others and may provide a higher classification accuracy. The best frequency may be determined by selecting a width of a frequency band, a step size for each iteration, a start frequency, and a stop frequency. As an example, the width of each frequency band may be 50 kHz, the step size for each iteration may be 10 kHz, the start frequency may be 0 kHz, and the stop frequency may be 1000 kHz. The method may be used to determine the PSD at each frequency for each frequency band from the start frequency to the stop frequency. The start and stop frequency may be increased by 10 kHz until the stop frequency reaches 1 MHz. An optimal threshold energy value may be determined that indicates a flow that has sand from a flow that does not have sand. A start frequency and a stop frequency may be determined that provide maximum accuracy for classifying a flow.

The storage 208 can be any storage device(s) for storing data. In some examples, the storage 208 can include a buffer or cache for storing data for processing by the compute components 202. Moreover, the storage 208 can store data from any of the components of the sand flow detection and quantification system 200. For example, the storage 208 can store input data used by the sand flow detection and quantification system 200, outputs or results generated by the sand flow detection and quantification system 200 (e.g., data and/or calculations from the detection engine 204, the quantification engine 206, etc.), user preferences, parameters and configurations, data logs, documents, software, media items, GUI content, and/or any other data and content.

While the sand flow detection and quantification system 200 is shown in FIG. 2 to include certain components, one of ordinary skill in the art will appreciate that the sand flow detection and quantification system 200 can include more or fewer components than those shown in FIG. 2. For example, the sand flow detection and quantification system 200 can also include one or more memory components (e.g., one or more RAMs, ROMs, caches, buffers, and/or the like), one or more input components, one or more output components, one or more processing devices, and/or one or more hardware components that are not shown in FIG. 2.

Figure 3:
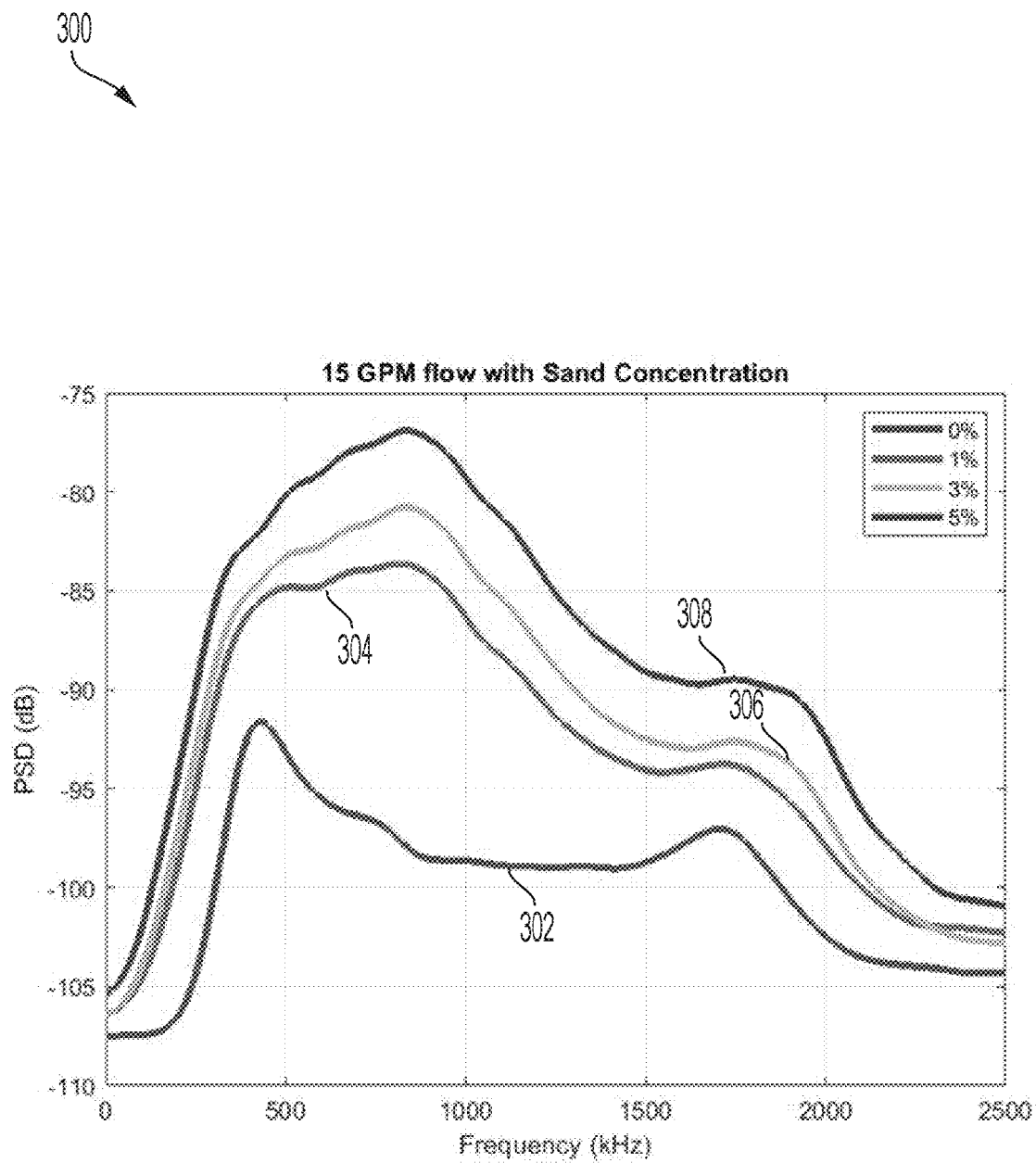
FIG. 3 is a graph of acoustic amplitude responses for various concentrations of sand flow in a fluid, in accordance with some examples.

FIG. 3 illustrates a graph 300 of acoustic amplitude responses for various concentrations of sand flow in a fluid according to an example. In this example, there is a fifteen gallon per minute (GPM) flow of fluid and various sand concentrations are graphed on a plot of PSD versus frequency for four different concentrations of sand. As shown in FIG. 3, a Power Spectral Density (PSD) is shown along one axis and a frequency is shown along another axis.

A first line 302 on the graph 300 indicates a zero percent sand concentration. This first line 302 indicates that a highest PSD is around 500 kHz and it is between −90 and −95 dB (e.g., flow only). A second line 304 on the graph 300 indicates a one percent sand concentration. The second line 304 indicates that a highest PSD is between 500 and 1000 KHz and it is around −85 dB. A third line 306 on the graph 300 indicates a three percent sand concentration. The third line 306 indicates that the highest PSD is between 500 and 1000 KHz and it is around −82 dB. A fourth line 308 on the graph 300 indicates a five percent sand concentration. The fourth line 308 indicates that the highest PSD is between 500 and 1000 KHz and it is around −77 dB.

Figure 4:
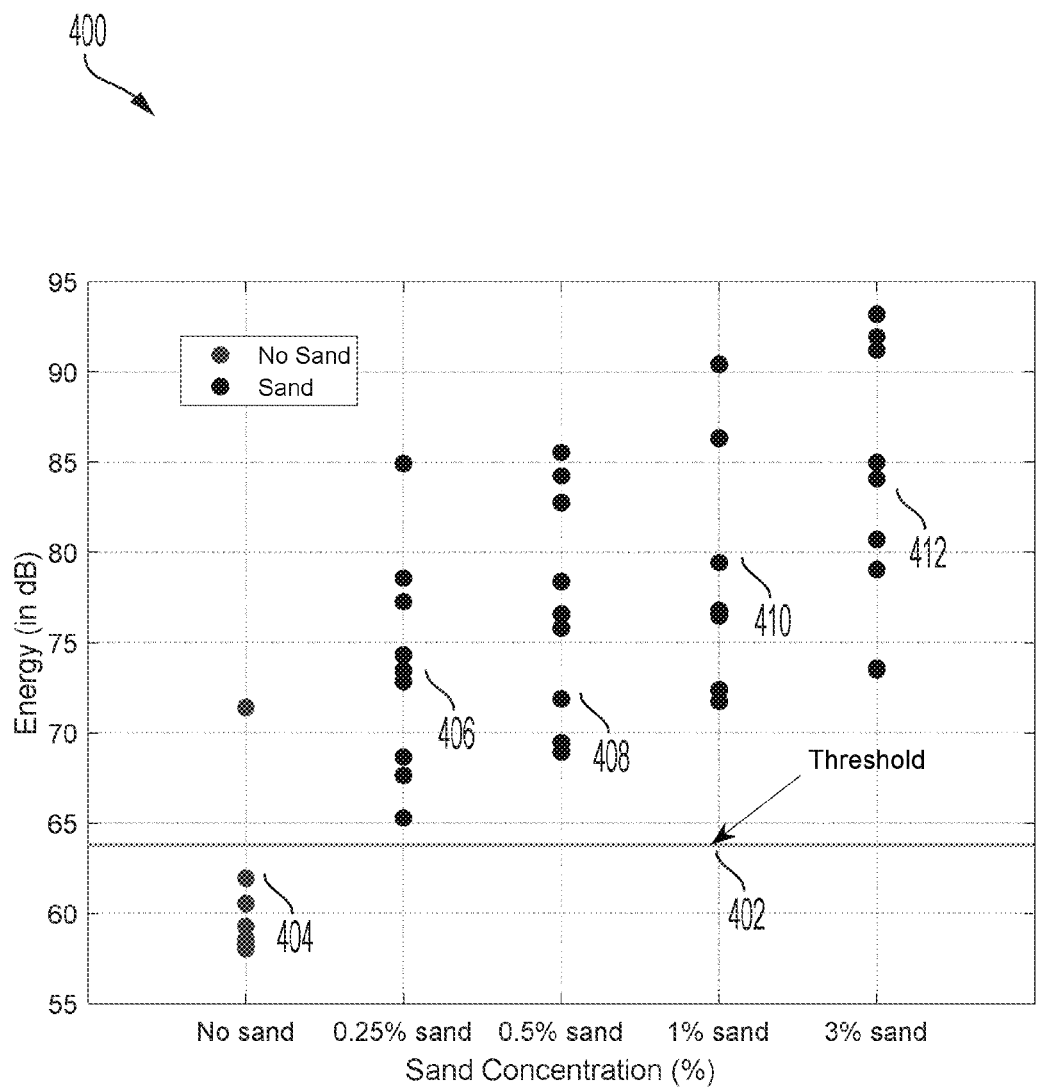
FIG. 4 is a graph of classification of sand flowing in a fluid using an energy threshold, in accordance with some examples.

FIG. 4 illustrates a graph 400 of a classification of sand flowing in a fluid using an energy threshold according to an example. As shown in FIG. 4, an energy in Decibels (dB) is shown along one axis and a sand concentration in percent volume is shown along another axis. Each sand concentration (e.g., each grouping of dots shown in graph 400) spans a range of different flow rate and orifice inner diameter sizes. A threshold line 402 is shown that may be used to separate and classify sand versus no-sand flows. Each dot shown on the graph 400 represents a particular energy or PSD in dB at a particular frequency and a sand concentration.

The data associated with grouping 404 indicates that no sand is present. The data associated with grouping 404 is above the threshold 402 and indicates that sand is present. The energy in dB appears to be around 60 dB.

The data associated with grouping 406 is above the threshold and indicates that sand is present. A sand concentration of 0.25% is shown for each dot associated with grouping 406. The energy in dB appears to range from 65 dB to 85 dB.

The data associated with grouping 408 is above the threshold and indicates that sand is present. A sand concentration of 0.5% is shown for each dot associated with grouping 408. The energy in dB appears to range from just below 70 dB to about 85 dB.

The data associated with grouping 410 is above the threshold and indicates that sand is present. A sand concentration of 1.0% is shown for each dot associated with grouping 410. The energy in dB appears to range from just above 70 dB to about 90 dB.

The data associated with grouping 412 is above the threshold and indicates that sand is present. A sand concentration of 3.0% is shown for each dot associated with grouping 412. The energy in dB appears to range from just under 75 dB to just under 95 dB.

Figure 5:
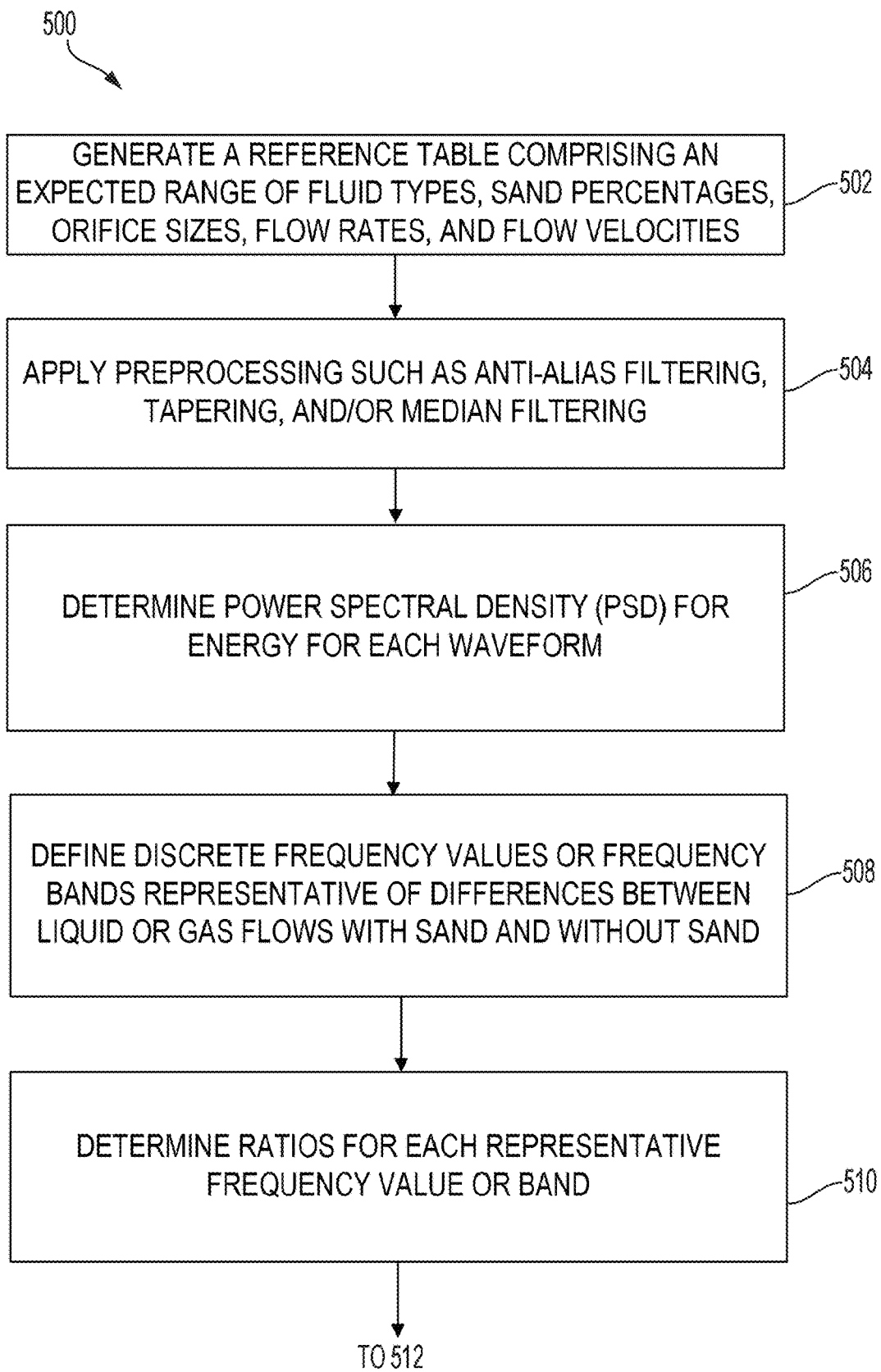
FIGS. 5 and 6 show a flowchart of an example method for calibrating the sand flow detection and quantification system, in accordance with some examples.
Figure 6:
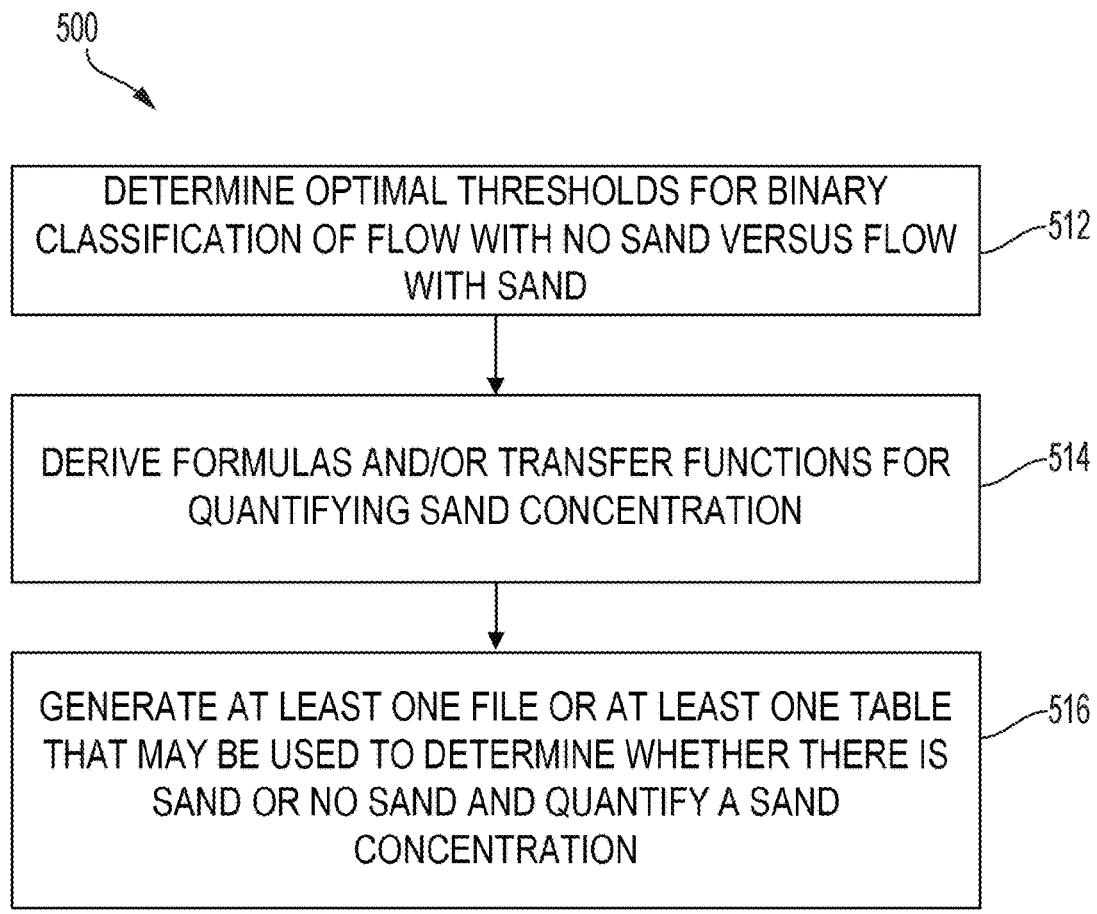

FIGS. 5 and 6 show a flowchart of an example method 500 for calibrating the sand flow detection and quantification system 200 according to an example. For the sake of clarity, the method 500 is described in terms of the sand flow detection and quantification system 200, as shown in FIG. 2, configured to practice the method. The steps outlined herein are exemplary and can be implemented in any combination thereof, including combinations that exclude, add, or modify certain steps.

At step 502, the sand flow detection and quantification system 200 can generate a reference table that may include an expected range of fluid types, sand percentage, orifice sizes, flow rates, and flow velocities. This reference table may be based on experimental and/or simulation data and be used to determine the presence of sand in a flow such as a liquid flow, a gas flow, and a liquid/gas flow. The reference table may be stored in storage 208.

At step 504, the sand flow detection and quantification system 200 can perform pre-processing such as anti-alias filtering, tapering, and/or median filtering. The pre-processing may be applied to the data in the reference table. At step 506, the sand flow detection and quantification system 200 can determine Power Spectral Density (PSD) for energy for each waveform in the reference table.

At step 508, the sand flow detection and quantification system 200 can define discrete frequency values or frequency bands representative of differences between liquid or gas flows with sand and liquid or gas flows without sand and include this information in the reference table. At step 510, the sand flow detection and quantification system 200 can determine and compute ratios for each representative frequency value or frequency band that is representative of the differences between liquid and gas flows with sand and liquid or gas flows without sand and include this information in the reference table.

At step 512, the sand flow detection and quantification system 200 can determine optimal thresholds for binary classification of flow with no sand (e.g., a flow with liquid, gas, or liquid/gas) or a flow with sand (e.g., a flow with sand and liquid, gas, or liquid/gas). The optimal thresholds may be based on experimental data such as acoustic data that indicates a typical amount of noise or energy in dB that is associated with a flow having at least a particular percentage of sand. The optimal thresholds may be included in the reference table. At step 514, the sand flow detection and quantification system 200 can derive formulas and/or transfer functions for quantifying sand concentration in the flow. The formulas and/or transfer functions can be included in the reference table.

At step 516, the sand flow detection and quantification system 200 can generate and/or receive at least one completed file or table based on the reference table that may be used to determine whether there is sand or no sand and quantify a sand concentration in a flow.

Figure 7:
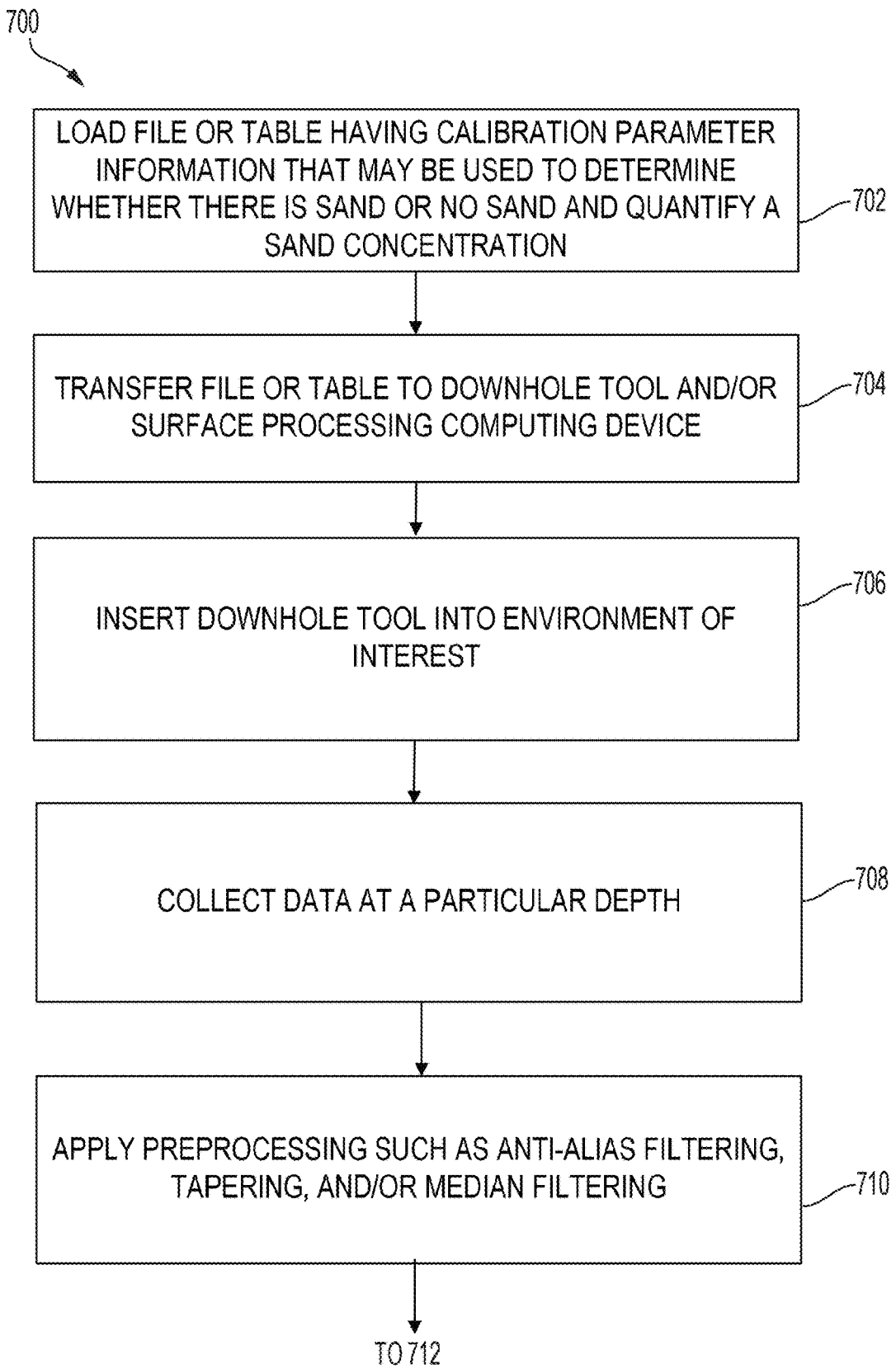
FIGS. 7 and 8 show a flowchart of an example method for detecting and quantifying sand in a liquid flow, in accordance with some examples.
Figure 8:
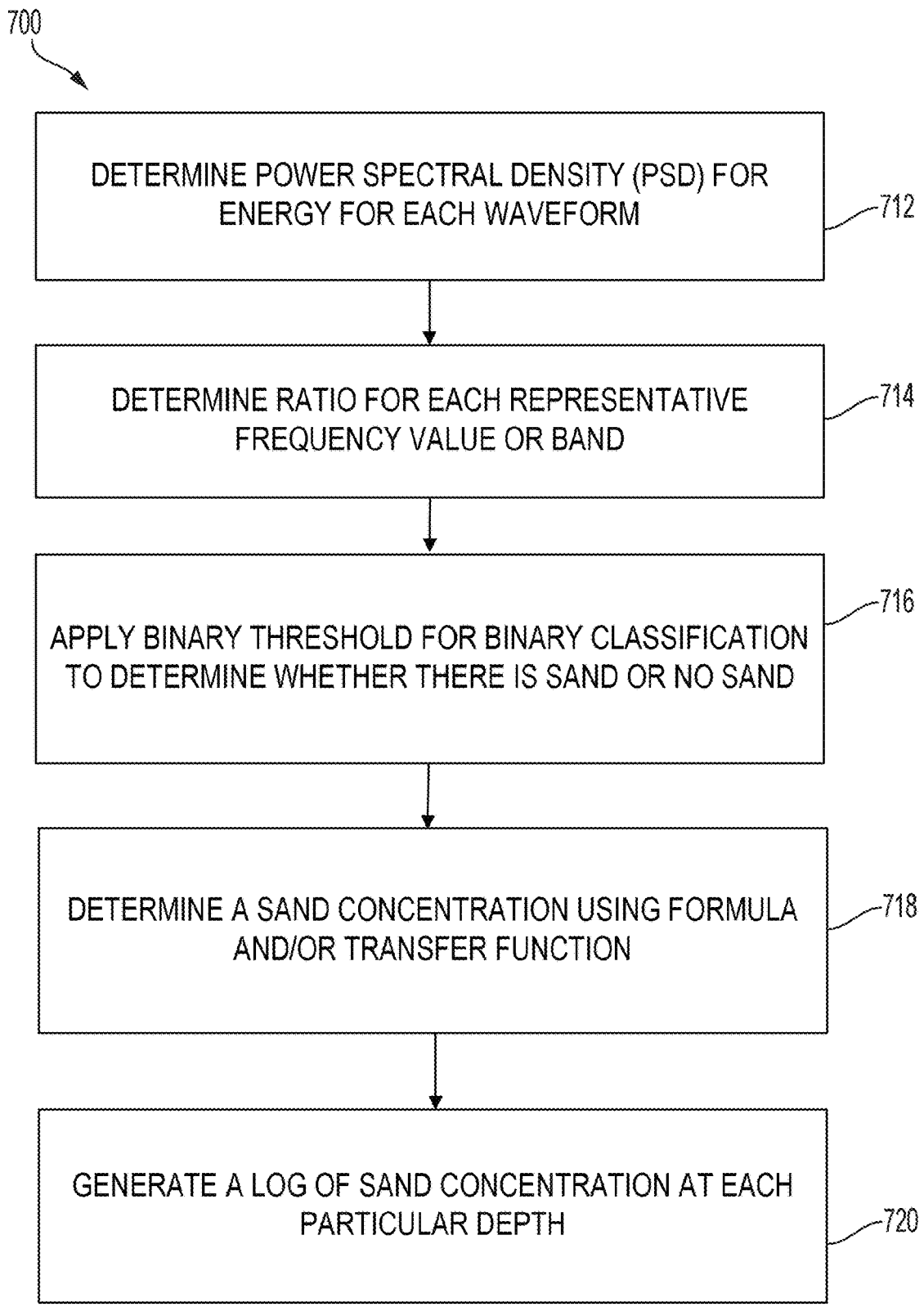

FIGS. 7 and 8 show a flowchart of an example method 700 for detecting and quantifying sand in a liquid flow according to an example. For the sake of clarity, the method 700 is described in terms of the sand flow detection and quantification system 200, as shown in FIG. 2, configured to practice the method. The steps outlined herein are exemplary and can be implemented in any combination thereof, including combinations that exclude, add, or modify certain steps.

At step 702, the sand flow detection and quantification system 200 can generate, receive, and/or obtain the completed file or table based on the reference table generated according to method 500. The reference table may be stored in storage 208. The file or table may have calibration parameter information that may be used to determine whether there is sand or no sand in a flow such as a liquid flow, a gas flow, or a liquid/gas flow and quantify a sand concentration in the flow.

At step 704, the sand detection and quantification system 200 can transfer the file or table to a downhole tool 126 and/or a surface processing computing device. At step 706, the sand detection and quantification system 200 can insert the downhole tool 126 into an environment of interest to collect data.

At step 708, the sand detection and quantification system 200 can collect data at a particular depth. The downhole tool 126 and/or other devices can be used to collect the data. As an example, at least one hydrophone arranged in an array may obtain acoustic data at the particular depth. The acoustic data may be audible noise created by the flow including the liquid, gas, and/or solid particulate matter in the flow. The solid particulate matter may be sand.

At step 710, the sand detection and quantification system 200 can apply preprocessing such as anti-alias filtering, tapering, and/or median filtering on the data collected at the particular depth. At step 712, the sand detection and quantification system 200 can determine Power Spectral Density (PSD) for energy in the acoustic data such as for each waveform in the preprocessed data.

At step 714, the sand detection and quantification system 200 can determine a ratio for each representative frequency or each frequency band. In other words, the sand detection and quantification system 200 can compare the preprocessed data at each representative frequency or frequency band with the data in the file or table.

The data may be evaluated to determine a Power Spectral Density (PSD) or amplitude at each different frequency at the particular depth. In one example, the frequency range may be from 250 kHz to 2,500 kHz. A number of discrete frequencies may be selected for collecting the acoustic data. The number of discrete frequency values where PSD is measured may span a range from lower frequencies to higher frequencies (e.g., 0.5 kHz, 5 kHz, 50 kHz, 500 kHz, 2,500 kHz) to characterize the flow. As another example, the PSD may be measured in range of frequencies such as 500 kHz, 1,000 kHz, 1,500 kHz, 2,000 kHz, and 2,500 kHz.

At step 716, the sand detection and quantification system 200 can apply a binary threshold for binary classification on the ratio or the comparison determined in step 714 to determine whether there is sand or no sand. As an example, for each frequency in the frequency range, if the average of the measured PSD minus the reference PSD is less than or equal to 5 dB, then it is determined that there is a liquid only flow. However, if the average of the measured PSD minus the reference PSD is greater than 5 dB, then it is determined that there is a flow with sand present in the liquid.

At step 718, the sand detection and quantification system 200 can determine a sand concentration in the flow using the formula and/or transfer function in the file or table. If there is no sand present in the flow, then the concentration is zero percent. The sand detection and quantification system 200 may quantify and determine a percentage of sand concentration in the flow at each different frequency at the particular depth, e.g., 0.25%, 0.5%, 1%, 3%, 5%, or another percentage. Alternatively, the sand concentration may be indicated as a number of parts-per-million.

In addition, the sand detection and quantification system 200 may generate a log of the sand concentration at each different frequency at the particular depth. The sand detection and quantification system 200 also may generate a graph of the sand concentration at each different frequency at the particular depth. The graph may be used to show the sand concentration at each different frequency at a plurality of depths in the environment of interest. In other words, the graph provides a profile of sand concentration at the plurality of depths in the wellbore. The method 700 may be repeated from steps 708 to 718 to determine and analyze the data at each desired depth.

At step 720, the sand detection and quantification system 200 can generate a log of the presence of sand and sand concentration at each particular depth. In addition, the sand detection and quantification system 200 can generate a graph illustrating a plot of sand concentration that shows the presence of sand and sand concentration at each particular depth. This graph may be shown on a user interface.

Figure 9:
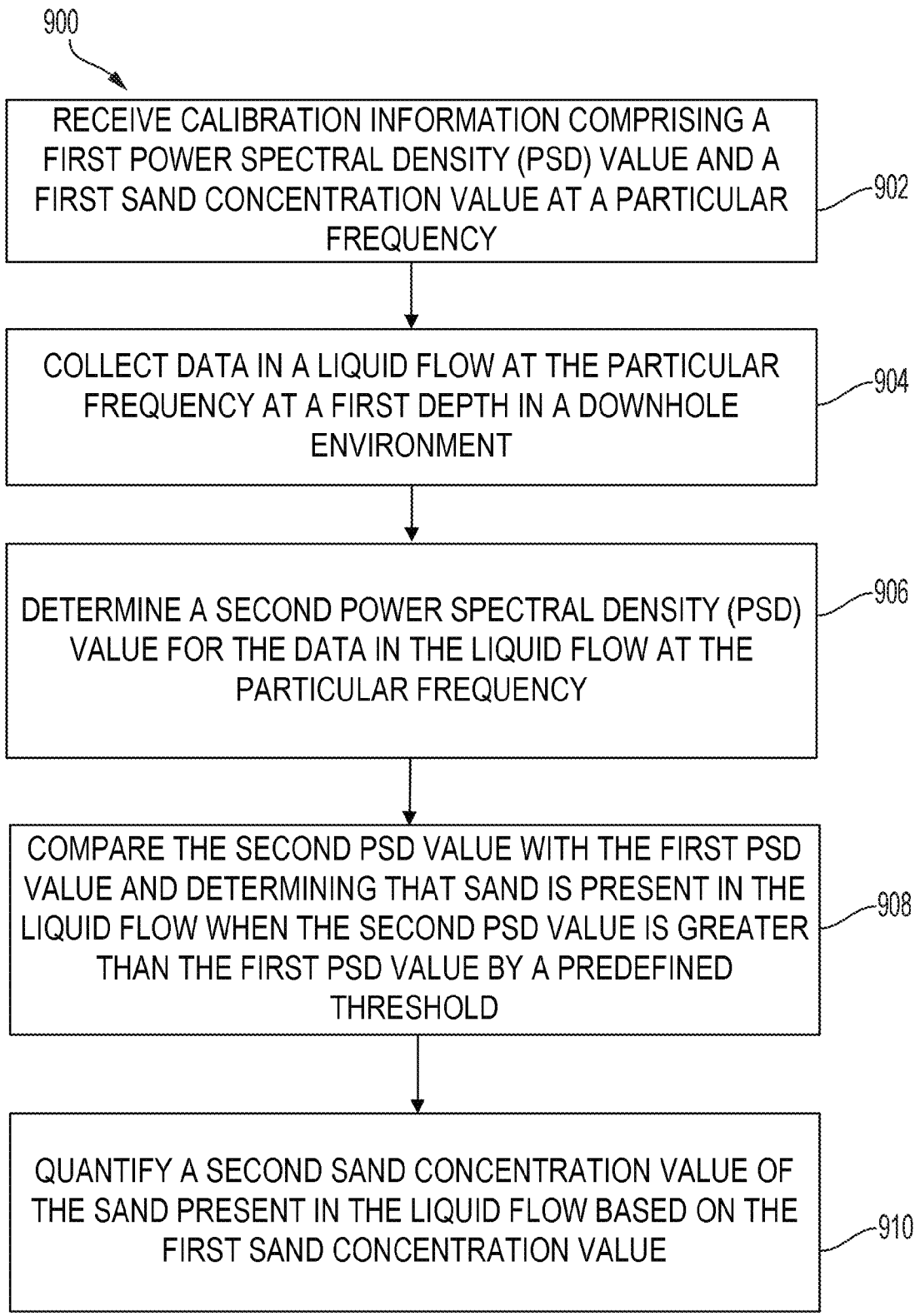
FIG. 9 is a flowchart of another example method for detecting and quantifying sand in a liquid flow, in accordance with some examples.
Figure 10:
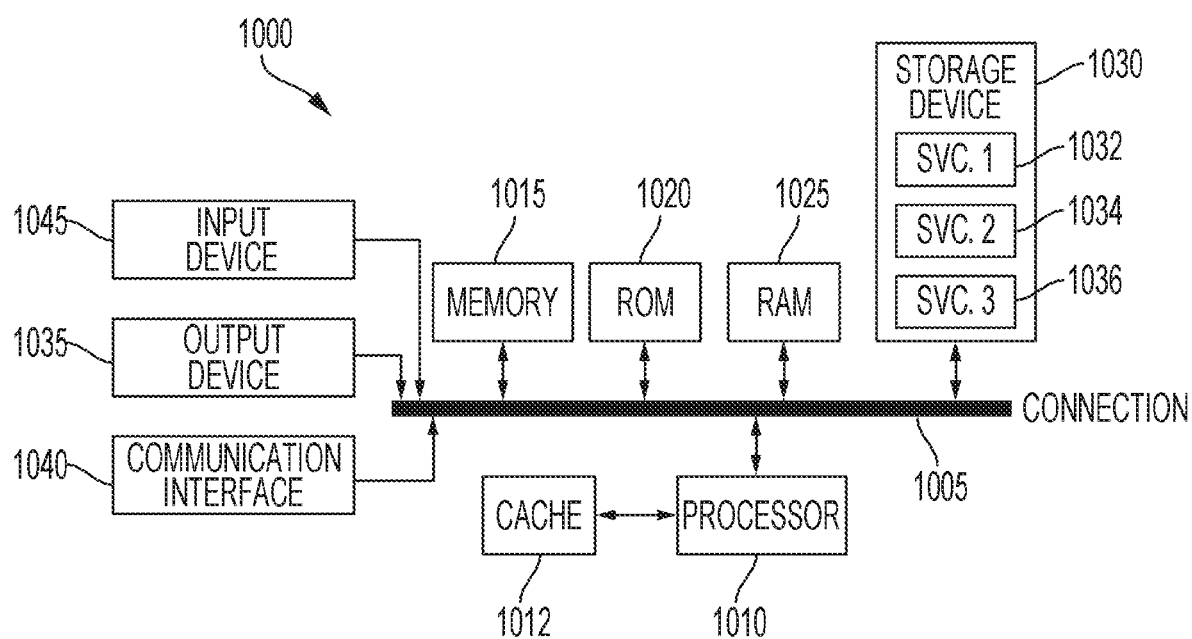
FIG. 10 is a schematic diagram of an example computing device architecture, in accordance with some examples.

Having disclosed some example system components and concepts, the disclosure now turns to FIG. 9, which illustrates an example method 900 for detecting and quantifying sand flows. For the sake of clarity, the method 900 is described in terms of the sand flow detection and quantification system 200, as shown in FIG. 2, configured to practice the method. The steps outlined herein are exemplary and can be implemented in any combination thereof, including combinations that exclude, add, or modify certain steps.

At step 902, the sand flow detection and quantification system 200 can receive calibration information including a first power spectral density (PSD) value and a first sand concentration value at a particular frequency. As noted above, the calibration information may be the reference file or table discussed herein, that includes information about reference PSDs and reference sand concentration values. The reference file or table may be stored in storage 208.

At step 904, the sand flow detection and quantification system 200 can collect data in a liquid flow, a gas flow, or a liquid/gas flow at the particular frequency at a first depth in a downhole environment. This may include collecting acoustic data in the liquid flow at the particular frequency in the downhole environment using a linear array or azimuthal of at least one hydrophone. In addition, the sand flow detection and quantification system 200 can collect the data in the liquid flow at a subset of particular frequencies ranging from 0 to 1 MHz. As an example, the frequencies may be 0.5 kHz, 5 kHz, 50 kHz, 500 kHz, 5,000 kHz, among others.

At step 906, the sand flow detection and quantification system 200 can determine a second power spectral density (PSD) value for the data in the liquid flow at the particular frequency. As another example, the PSD may be measured in range of frequencies such as 500 kHz, 1,000 kHz, 1,500 kHz, 2,000 kHz, and 2,500 kHz. In one example, the sand flow detection and quantification system 200 can collect acoustic data at each frequency in the downhole environment using a linear array or an azimuthal array of at least one hydrophone and determine the PSD at each frequency.

At step 908, the sand flow detection and quantification system 200 can compare the second PSD value with the first PSD value and determine that sand is present in the liquid flow when the second PSD value is greater than the first PSD value by a predefined or particular threshold. As an example, if the average of the measured PSD minus the reference PSD is less than or equal to 5 dB, then it is determined that there is a liquid only flow. However, if the average of the measured PSD minus the reference PSD is greater than 5 dB, then it is determined that there is a flow with sand present in the liquid.

At step 910, the sand flow detection and quantification system 200 can quantify a second sand concentration value of the sand present in the liquid flow based on the first sand concentration value. This may include determining a percentage of the second sand concentration value present in the liquid flow based on the first sand concentration value.

Before or after the second sand concentration value is quantified, the sand flow detection and quantification system 200 send can send a determination that the sand is present in the liquid flow uphole from the downhole environment in real-time to a computing device. The determination may be in the form of a message or a notification sent to a computing device located on the surface. The sand flow detection and quantification system 200 also can send another message or notification that indicates the second sand concentration value. In another example, the message or notification may include the determination of whether sand is present in the flow and also may include the second sand concentration value. The message or notification or information associated with the message or notification may be displayed on a display such as the display device 210 and/or another display using a graphical user interface (GUI). For example, the display device 210 may display the log and/or the graph. The display device 210 also may display information associated with a location of the environment, a location of where sand was determined to be present in the environment such as the location in the wellbore 116, and a sand concentration determined to be present in the environment such as the location in the wellbore 116.

The sand detection and quantification system 200 may quantify and determine a percentage of sand concentration in the flow at each different frequency at the particular depth, e.g., 0.25%, 0.5%, 1%, 3%, 5%, or another percentage. Alternatively, the sand concentration may be indicated as a number of parts-per-million.

After the method 900 is performed at a first depth, it may be repeated in whole at a second depth. In other words, the method may include collecting the data in the liquid flow at a second depth in the downhole environment.

In addition, the sand detection and quantification system 200 may generate a log of the sand concentration at each different frequency at the particular depth and store the log in a database or in memory. The sand detection and quantification system 200 also may generate a graph of the sand concentration at each different frequency at the particular depth. The graph may be used to show the sand concentration at each different frequency at a plurality of depths in the environment of interest. In other words, the graph provides a profile of sand concentration at the plurality of depths in the wellbore.

Having disclosed example systems, methods, and technologies for detecting and quantifying sand flow in a tubular structure, the disclosure now turns to FIG. 10, which illustrates an example computing device architecture 1000 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 10 illustrates an example computing device architecture 1000 of a computing device which can implement the various technologies and techniques described herein. For example, the computing device architecture 1000 can implement the system 200 shown in FIG. 2 and perform various steps, methods, and techniques disclosed herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device, etc. In some instances, multimodal computing devices can enable a user to provide multiple types of input to communicate with the computing device architecture 1000. The communications interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include services 1032, 1034, 1036 for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising receiving, by at least one processor, calibration information comprising a first power spectral density (PSD) value and a first sand concentration value at a particular frequency, collecting, by at least one processor, data in a liquid flow at the particular frequency at a first depth in a downhole environment, determining, by the at least one processor, a second power spectral density (PSD) value for the data in the liquid flow at the particular frequency, comparing, by the at least one processor, the second PSD value with the first PSD value and determining that sand is present in the liquid flow when the second PSD value is greater than the first PSD value by a predefined threshold, and quantifying, by the at least one processor, a second sand concentration value of the sand present in the liquid flow based on the first sand concentration value.

Statement 2: A method according to Statement 1, further comprising collecting acoustic data in the liquid flow at the particular frequency in the downhole environment using a linear array of at least one hydrophone.

Statement 3: A method according to any of Statements 1 and 2, further comprising collecting the data in the liquid flow at a second depth in the downhole environment.

Statement 4: A method according to any of Statements 1 through 3, further comprising sending a determination that the sand is present in the liquid flow uphole from the downhole environment in real-time to a computing device.

Statement 5: A method according to any of Statements 1 through 4, further comprising determining a percentage of the second sand concentration value present in the liquid flow based on the first sand concentration value.

Statement 6: A method according to any of Statements 1 through 5, further comprising generating a log of the percentage of the second sand concentration value present in the liquid flow at the first depth in the downhole environment and storing the log in a database.

Statement 7: A method according to any of Statements 1 through 6, collecting the data in the liquid flow at a subset of particular frequencies ranging from 0 to 5 MHz.

Statement 8: A system comprising one or more processors and at least one computer-readable storage medium having stored therein instructions which, when executed by the one or more processors, cause the system to: receive calibration information comprising a first power spectral density (PSD) value and a first sand concentration value at a particular frequency, collect data in a liquid flow at the particular frequency at a first depth in a downhole environment, determine a second power spectral density (PSD) value for the data in the liquid flow at the particular frequency, compare the second PSD value with the first PSD value and determining that sand is present in the liquid flow when the second PSD value is greater than the first PSD value by a predefined threshold, and quantify a second sand concentration value of the sand present in the liquid flow based on the first sand concentration value.

Statement 9: A system according to Statement 8, further comprising a linear array of at least one hydrophone to collect acoustic data in the liquid flow at the particular frequency in the downhole environment.

Statement 10: A system according to any of Statements 8 and 9, the at least one processor further to collect the data in the liquid flow at a second depth in the downhole environment.

Statement 11: A system according to any of Statements 8 through 10, the at least one processor further to send a determination that the sand is present in the liquid flow uphole from the downhole environment in real-time to a computing device.

Statement 12: A system according to any of Statements 8 through 11, the at least one processor further to determine a percentage of the second sand concentration value present in the liquid flow based on the first sand concentration value.

Statement 13: A system according to any of Statements 8 through 12, the at least one processor further to generate a log of the percentage of the second sand concentration value present in the liquid flow at the first depth in the downhole environment and storing the log in a database.

Statement 14: A system according to any of Statements 8 through 13, the at least one processor further to collect the data in the liquid flow at a subset of particular frequencies ranging from 0 to 5 MHz.

Statement 15: A non-transitory computer-readable storage medium comprising instructions stored on the non-transitory computer-readable storage medium, the instructions, when executed by one more processors, cause the one or more processors to perform operations including: receiving calibration information comprising a first power spectral density (PSD) value and a first sand concentration value at a particular frequency, collecting data in a liquid flow at the particular frequency at a first depth in a downhole environment, determining a second power spectral density (PSD) value for the data in the liquid flow at the particular frequency, comparing the second PSD value with the first PSD value and determining that sand is present in the liquid flow when the second PSD value is greater than the first PSD value by a predefined threshold, and quantifying a second sand concentration value of the sand present in the liquid flow based on the first sand concentration value.

Statement 16: A non-transitory computer-readable storage medium according to Statement 15, the operations further comprising collecting acoustic data in the liquid flow at the particular frequency in the downhole environment using a linear array of at least one hydrophone.

Statement 17: A non-transitory computer-readable storage medium according to any of Statements 15 and 16, the operations further comprising collecting the data in the liquid flow at a second depth in the downhole environment.

Statement 18: A non-transitory computer-readable storage medium according to any of Statements 15 through 17, the operations further comprising sending a determination that the sand is present in the liquid flow uphole from the downhole environment in real-time to a computing device.

Statement 19: A non-transitory computer-readable storage medium according to any of Statements 15 through 18, the operations further comprising determining a percentage of the second sand concentration value present in the liquid flow based on the first sand concentration value.

Statement 20: A non-transitory computer-readable storage medium according to any of Statements 15 through 19, the operations further comprising generating a log of the percentage of the second sand concentration value present in the liquid flow at the first depth in the downhole environment and storing the log in a database.

Statement 21: A system comprising means for performing a method according to any of Statements 1 through 7.

We claim:
1. A method comprising:
receiving, by at least one processor, calibration information comprising a first power spectral density (PSD) value and a first sand concentration value at a particular frequency;
collecting, by at least one processor, data in a liquid flow at the particular frequency at a first depth in a downhole environment;
determining, by the at least one processor, a second power spectral density (PSD) value for the data in the liquid flow at the particular frequency;
comparing, by the at least one processor, the second PSD value with the first PSD value and determining that sand is present in the liquid flow when the second PSD value is greater than the first PSD value by a predefined threshold; and
quantifying, by the at least one processor, a second sand concentration value of the sand present in the liquid flow based on the first sand concentration value.
2. The method of claim 1, further comprising collecting acoustic data in the liquid flow at the particular frequency in the downhole environment using a linear array of at least one hydrophone.
3. The method of claim 1, further comprising collecting the data in the liquid flow at a second depth in the downhole environment.
4. The method of claim 1, further comprising sending a determination that the sand is present in the liquid flow uphole from the downhole environment in real-time to a computing device.
5. The method of claim 1, further comprising determining a percentage of the second sand concentration value present in the liquid flow based on the first sand concentration value.
6. The method of claim 1, further comprising generating a log of the percentage of the second sand concentration value present in the liquid flow at the first depth in the downhole environment and storing the log in a database.
7. The method of claim 1, further comprising collecting the data in the liquid flow at a subset of particular frequencies ranging from 0 to 5 MHz.
8. A system comprising:
at least one processor; and
at least one computer-readable storage medium having stored therein instructions, which when executed by the at least one processor cause the system to:
receive calibration information comprising a first power spectral density (PSD) value and a first sand concentration value at a particular frequency;
collect data in a liquid flow at the particular frequency at a first depth in a downhole environment;
determine a second power spectral density (PSD) value for the data in the liquid flow at the particular frequency;
compare the second PSD value with the first PSD value and determine that sand is present in the liquid flow when the second PSD value is greater than the first PSD value by a predefined threshold; and
quantify a second sand concentration value of the sand present in the liquid flow based on the first sand concentration value.
9. The system of claim 8, further comprising a linear array of at least one hydrophone to collect acoustic data in the liquid flow at the particular frequency in the downhole environment.
10. The system of claim 8, the at least one processor further to collect the data in the liquid flow at a second depth in the downhole environment.
11. The system of claim 8, the at least one processor further to send a determination that the sand is present in the liquid flow uphole from the downhole environment in real-time to a computing device.
12. The system of claim 8, the at least one processor further to determine a percentage of the second sand concentration value present in the liquid flow based on the first sand concentration value.
13. The system of claim 8, the at least one processor further to generate a log of the percentage of the second sand concentration value present in the liquid flow at the first depth in the downhole environment and storing the log in a database.
14. The system of claim 8, the at least one processor further to collect the data in the liquid flow at a subset of particular frequencies ranging from 0 to 5 MHz.
15. A non-transitory computer-readable medium having instructions stored thereon that, when executed by at least one processor, cause the at least one processor to perform operations comprising:
receiving calibration information comprising a first power spectral density (PSD) value and a first sand concentration value at a particular frequency;
collecting data in a liquid flow at the particular frequency at a first depth in a downhole environment;
determining a second power spectral density (PSD) value for the data in the liquid flow at the particular frequency;
comparing the second PSD value with the first PSD value and determining that sand is present in the liquid flow when the second PSD value is greater than the first PSD value by a predefined threshold; and
quantifying a second sand concentration value of the sand present in the liquid flow based on the first sand concentration value.
16. The non-transitory computer-readable medium of claim 15, the operations further comprising collecting acoustic data in the liquid flow at the particular frequency in the downhole environment using a linear array of at least one hydrophone.
17. The non-transitory computer-readable medium of claim 15, the operations further comprising collecting the data in the liquid flow at a second depth in the downhole environment.
18. The non-transitory computer-readable medium of claim 15, the operations further comprising sending a determination that the sand is present in the liquid flow uphole from the downhole environment in real-time to a computing device.
19. The non-transitory computer-readable medium of claim 15, the operations further comprising determining a percentage of the second sand concentration value present in the liquid flow based on the first sand concentration value.
20. The non-transitory computer-readable medium of claim 15, the operations further comprising generating a log of the percentage of the second sand concentration value present in the liquid flow at the first depth in the downhole environment and storing the log in a database.

\* \* \* \* \*